US012636608B2

(12) United States Patent
Kalinowski

(10) Patent No.: US 12,636,608 B2
(45) Date of Patent: May 26, 2026

(54) METHOD OF PRODUCING A DESICCANT ROTOR

(71) Applicant: Munters Corporation, Amesbury, MA (US)

(72) Inventor: Benjamin J. Kalinowski, Newton, NH (US)

(73) Assignee: Munters Corporation, Amesbury, MA (US)

( * ) Notice: Subject to any disclaimer, the term of this patent is extended or adjusted under 35 U.S.C. 154(b) by 363 days.

(21) Appl. No.: 18/524,269

(22) Filed: Nov. 30, 2023

(65) Prior Publication Data

US 2025/0177904 A1      Jun. 5, 2025

(51) Int. Cl.
*B01D 53/06*      (2006.01)
*B01D 53/26*      (2006.01)
*B01D 53/30*      (2006.01)
*F24F 3/14*      (2006.01)

(52) U.S. Cl.
CPC ........... *B01D 53/06* (2013.01); *B01D 53/261* (2013.01); *B01D 53/30* (2013.01); *F24F 3/1423* (2013.01); *B01D 2257/80* (2013.01); *B01D 2258/06* (2013.01); *B01D 2259/4009* (2013.01); *F24F 2003/1458* (2013.01); *F24F 2203/1032* (2013.01)

(58) Field of Classification Search
CPC ...... B01D 53/06; B01D 53/261; F24F 3/1423
See application file for complete search history.

(56) References Cited

U.S. PATENT DOCUMENTS

| | | | |
|---|---|---|---|
| 4,228,847 A | 10/1980 | Lindahl | |
| 2015/0153051 A1 | 6/2015 | Pahwa et al. | |
| 2021/0190338 A1 | 6/2021 | Unge et al. | |

FOREIGN PATENT DOCUMENTS

| | | | | |
|---|---|---|---|---|
| CN | 218221797 U | | 1/2023 | |
| EP | 0308497 B1 | | 1/1994 | |
| JP | 3795630 B2 | | 7/2006 | |
| JP | 2008128552 A | * | 6/2008 | |
| JP | 2010-196993 A | | 9/2010 | |
| KR | 100598214 B1 | | 7/2006 | |
| KR | 101769620 B1 | | 8/2017 | |
| KR | 10-2191089 B1 | | 12/2020 | |

OTHER PUBLICATIONS

Office Action dated Jun. 20, 2024, in Swedish Patent Application No. 2351375-7.
Search Report and Written Opinion dated Feb. 4, 2025, in International Patent Application No. PCT/US2024/056692.

* cited by examiner

*Primary Examiner* — Robert A Hopkins
(74) *Attorney, Agent, or Firm* — Venable LLP

(57) ABSTRACT

A method of producing a desiccant rotor (2) of a desiccant dehumidifier (1), said desiccant rotor (2) comprising a plurality of channels (4) extending through the rotor (2), said method comprising the steps of: a) building the rotor layer by layer, wherein at least every second layer (5) is corrugated such that a channel is defined between at a first layer (3) and a neighbouring second layer (5), and b) positioning a sensor (9, 11, 13, 15) onto a surface of the first layer (3) or the second layer (5), which surface will define said channel (4) upon said attachment of the first layer (3) to the second layer (5).

22 Claims, 2 Drawing Sheets

METHOD OF PRODUCING A DESICCANT ROTOR

TECHNICAL FIELD

The present invention relates to a method of producing a desiccant rotor of a desiccant dehumidifier, said desiccant rotor comprising a plurality of channels extending through the rotor.

BACKGROUND

Desiccant rotors are used for drying air that passes through channels provided in the desiccant rotor. The desiccant rotor is designed to rotate such that surfaces of channels provided therein are repeatedly subjected to a flow of a gas, typically air, through said channel. Thereby, the desiccant rotor will de-humidify gases, such as air, that passes through the channels of the rotor. In connection to such operation, it is of interest to get information about the temperature and humidity of the gas passing through the rotor. During rotation of the rotor, the channels are typically also repeatedly subjected to regeneration, wherein the temperature and moisture content of the channel is regulated by a regeneration process, which is known per se.

JP3795630 B2 discloses a desiccant rotor in a dehumidifier system. The desiccant rotor comprises sensors. The purpose of the solution shown in JP3795630 B2 is to be perform a diagnosis of the state of deterioration in a rotor on "a second-stage dry moisture-decreasing device" without having to use a dew point meter. Two temperature sensors are disclosed. The rotor has a regeneration area in a part of a chamber in which the rotor rotates. The temperature-detecting part of a temperature sensor is arranged on the side close to a moisture decreasing area on the outlet side of the regeneration area, and the temperature detecting part of a temperature sensor is disposed on the side close to a purge area. Thus, it is possible to compare the temperature of a regeneration outlet measured by the two temperature sensors at the time of a normal rotor state to the temperature of a regeneration outlet at the time of a qualitative deterioration of the rotor and thereby, determine the degree of the qualitative deterioration of the rotor through diagnosis. A precise disclosure of how exactly where to provide and how to arranged the sensors is not presented in JP3795630 B.

KR102191089 B1 discloses a desiccant rotor in a dehumidifier system. The rotor has "smart" technology and the system is equipped with multiple sensors conveying information to a control terminal. The sensors appear to be located within the space to be treated and not in the dehumidifier itself.

It is an object of the present invention to present a method of providing a desiccant rotor with sensors that promotes efficient and correct measurement of conditions, such as temperature and humidity of a gas passing through the rotor, and possibly also about conditions, such as the temperature and humidity, of surfaces of the rotor that are in contact with such gas.

SUMMARY

The object of the invention is achieved by means of a method of producing a desiccant rotor of a desiccant dehumidifier, said desiccant rotor comprising a plurality of channels extending through the rotor, said method comprising the steps of:

a) building the rotor layer by layer, wherein at least every second layer is corrugated such that a channel is defined between at a first layer and a neighbouring second layer, and b) positioning a sensor onto a surface of the first layer or the second layer, which surface will define said channel upon said attachment of the first layer to the second layer.

According to some embodiments of the invention, the method of the invention comprises the step of:

c) applying an adhesive on and around the sensor after positioning of the sensor on said surface.

According to some embodiments of the invention step c) comprises applying said adhesive on all surfaces that define said channel or channels formed between the first and second layers.

The channels may partially extend in an axial direction and partially in a radial direction. According to some embodiments the plurality of channels extend in an axial direction of the rotor.

According to some embodiments, said sensor or sensors is a sensor for sensing any of humidity, temperature, pressure or $CO_2$-content, or VOC-content (Volatile Organic Compounds), such as NMP (N-Methyl-2-pyrrolidone).

According to some embodiments of the invention, a body comprising a stack of first and second layers is formed by repetition of step a), wherein the desiccant rotor is formed by the step of:

d) providing said body with a hub or a rotation centre around which the body is configured to rotate during operation.

According to some embodiments of the invention, the method further comprises the steps of:

e) providing an electric contact ring on an outer periphery of said body, and f) providing an electric conductor extending from the contact ring to the sensor.

According to some embodiments of the invention, the method comprises the further step of:

g) attaching a second sensor onto a surface of a first layer or a second layer, which surface will define a channel upon said attachment of the first sheet to the second sheet, wherein the second sensor is arranged at a different depth of said channel as seen in an axial direction of the formed desiccant rotor than the depth at which the first sensor is provided or at a different distance from a rotational centre axis of the rotor.

According to some embodiments of the invention, the first sensor and the second sensors are configured to sense the same observable.

According to some embodiments of the invention, the first and second sensors are provided in the same channel.

According to some embodiments of the invention, the first and second sensors are provided in different channels.

According to some embodiments of the invention, the first sensor and the second sensor are provided in different channels, wherein said channels are provided at different distances from said hub or rotational centre.

The object of the invention is also achieved by means of a desiccant rotor, comprising a plurality of channels extending through the rotor, said rotor comprising at least one first sensor attached to a surface which defines one of said channels.

The channels may partially extend in an axial direction and partially in a radial direction. According to some embodiments the plurality of channels extend in an axial direction of the rotor.

According to some embodiments, said sensor or sensors is a sensor for sensing any of humidity, temperature, pressure or $CO_2$-content, or VOC-content (Volatile Organic Compounds), such as NMP (N-Methyl-2-pyrrolidone).

According to one embodiment, the desiccant rotor comprises an electric contact ring on an outer periphery of said body, and an electric conductor extending from the contact ring to the sensor.

According to one embodiment, the desiccant rotor comprises a second sensor attached to a surface which defines one of said channels, wherein the second sensor is arranged at a different depth of said channel as seen in an axial direction of the formed desiccant rotor than the depth at which the first sensor is provided, and/or at a different distance from a rotational centre axis of the rotor.

According to one embodiment, the first and second sensors are provided in different channels.

According to one embodiment, the desiccant rotor comprises clusters of sensors, each cluster comprising at least two sensors, wherein a plurality of clusters is arranged at a first level in the axial direction of the rotor, and a corresponding plurality of clusters is arranged at second level in the axial direction of the desiccant rotor.

According to one embodiment, the desiccant rotor is produced in accordance with the method disclosed hereinabove.

According to one aspect of the present disclosure, the object of the invention is achieved by means of a desiccant dehumidifier, comprising a desiccant rotor according to the present disclosure,
a control unit,
a transmitter for transmitting the output of the sensors as input to the control unit, at least one of a fan for forcing regeneration air through a first sector of the rotor, a heater for heating the regeneration air before the regeneration air passes through the rotor, a fan for forcing process air through a second sector of the rotor, a rotor drive device for rotating the rotor,
wherein the control unit is configured to control the output of at least one the fan for forcing regeneration air through the first sector of the rotor, the heater for heating the regeneration air before the regeneration air passes through the rotor, the fan for forcing process air through the second sector of the rotor, and the rotor drive device for rotating the rotor on basis of the input from the transmitter.

According to some embodiments, the desiccant dehumidifier comprises a fan for forcing regeneration air through a first sector of the rotor, a heater for heating the regeneration air before the regeneration air passes through the rotor, a fan for forcing process air through a second sector of the rotor, and a rotor drive device for rotating the rotor, wherein the control unit is configured to control the output of each of the fan for forcing regeneration air through the first sector of the rotor, the heater for heating the regeneration air before the regeneration air passes through the rotor, the fan for forcing process air through the second sector of the rotor, and the rotor drive device for rotating the rotor on basis of the input from the transmitter.

Further feature and advantages of the present invention will be presented in the following detailed description of an exemplifying embodiment of the present invention.

4

Figure 1:
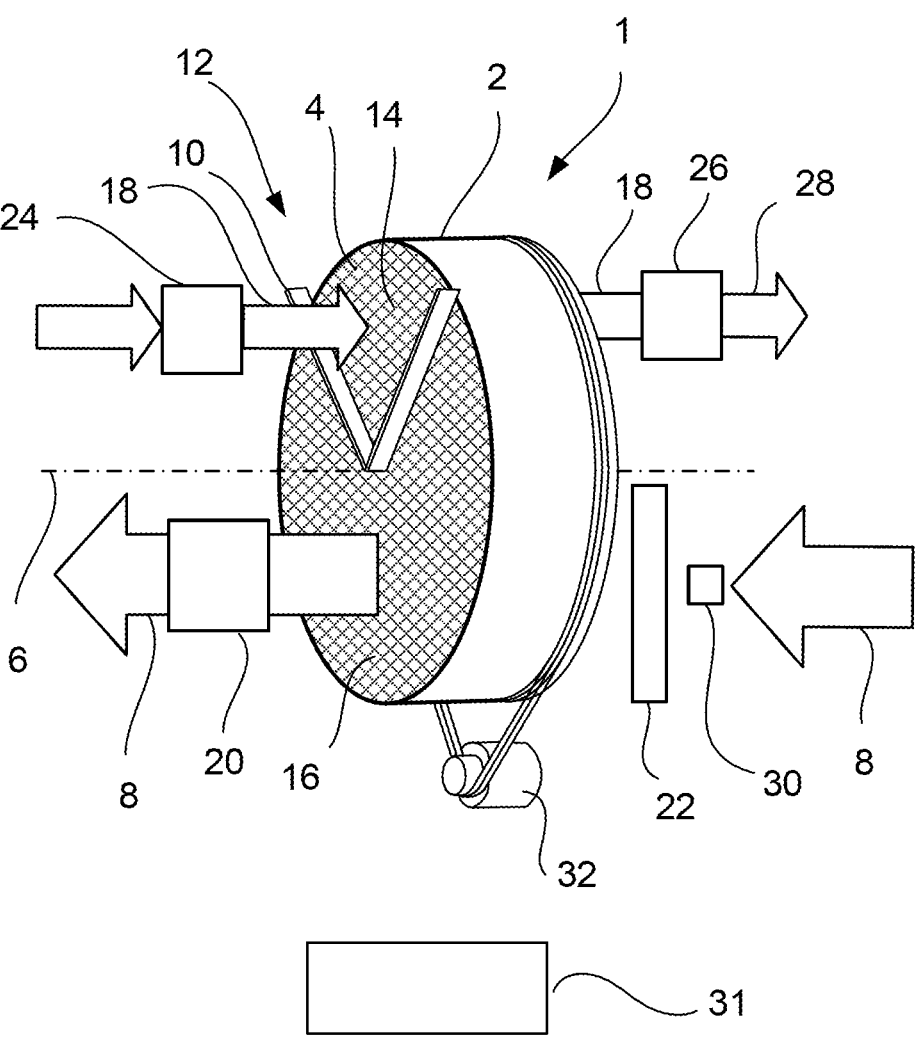
FIG. 1 shows a desiccant dehumidifier comprising a desiccant rotor according to the present invention.
Figure 2:
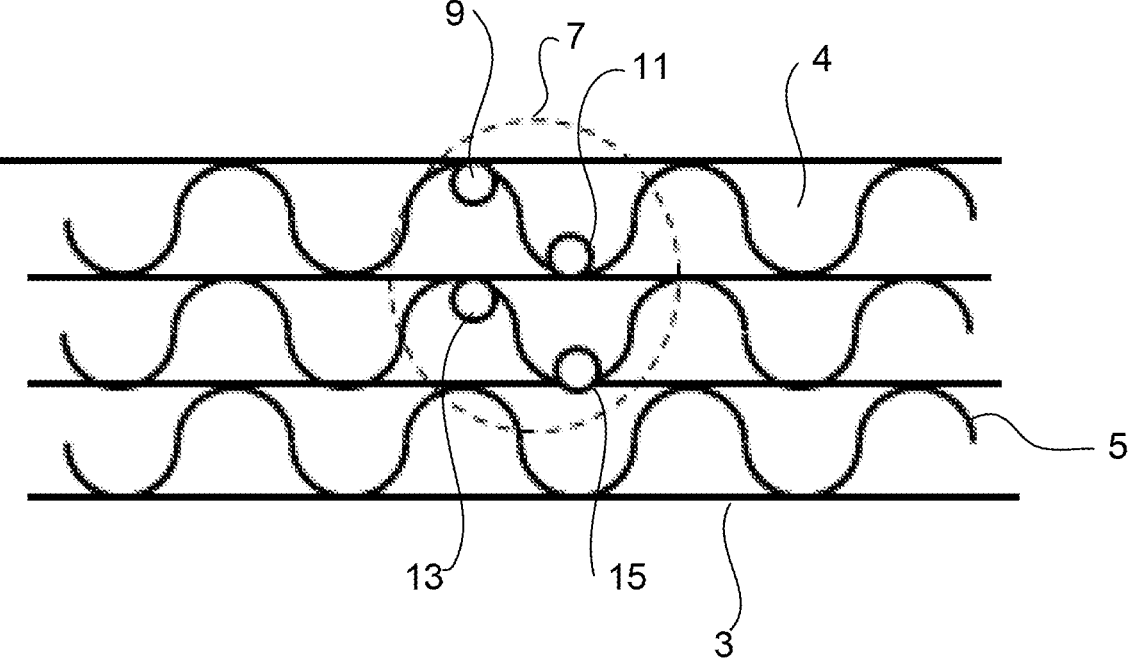

FIG. 2 shows a layered structure of the rotor shown in FIG. 1.

DETAILED DESCRIPTION

FIG. 1 schematically illustrates the principle of a desiccant dehumidifier 1 according to an example. The desiccant dehumidifier 1 comprises a desiccant rotor 2. A number of channels 4 are arranged in the desiccant rotor 2. The channels 4 may extend from one side to the other of the desiccant rotor 2. The channels 4 are parallel to the center axis 6 of the desiccant rotor 2. A process airflow 8 may pass the channels 4. The desiccant rotor 2 is adapted to treat the process air by reducing water in the process air that may pass through the channels 4 of the desiccant rotor 2. A generally V-shaped, partition member 10 segregates a pie-shaped portion 12 of the desiccant rotor 2 from the remaining portion thereof to define a reactivation section 14 of the desiccant rotor 2. The remaining portion of the desiccant rotor 2 defines a process section 16. The reactivation section 14 of the desiccant rotor 2 may occupies about one quarter to one third of the surface area of the desiccant rotor 2. In the desiccant dehumidifier 1 the process air to be dehumidified is allowed to flow through the channels 4 in the desiccant rotor 2. A heated reactivation airflow 18 is, at the same time, allowed to pass in counter-flow through the reactivation section 14 of the desiccant rotor 2. The reactivation airflow 18, increases the temperature of the desiccant rotor 2, so that the desiccant rotor 2 gives off its moisture which is then carried away by the reactivation airflow 18. The dried desiccant material in the desiccant rotor 2 is rotated into the process section 16, where it once again absorbs moisture from the process air. A process air fan 20 is configured for drawing process air from the air that surrounds the desiccant dehumidifier 1 and urging it to flow through a filter element 22 and the process section 16 of the desiccant rotor 2 in order to remove moisture from the process air. Downstream of the process section 16 of the desiccant rotor 2 the dehumidified process airflow 8 is exhausted into the enclosed space that surrounds the desiccant dehumidifier 1. The reactivation air is drawn from the air that surrounds the desiccant dehumidifier 1 and heated in a heater 24. A reactivation air fan 26 may be arranged for drawing the reactivation air from air that surrounds the desiccant dehumidifier 1 and urging it to flow through the reactivation section 14 of the desiccant rotor 2 in order to cause the moisture trapped in the reactivation section 14 to be released therefrom into the reactivation airflow 18. A reactivation air outlet 20 is located downstream of the reactivation section 14 of the desiccant rotor 2 for exhausting the moist reactivation airflow 18 outside an enclosed space wherein the desiccant dehumidifier 1 is situated. A particle detector 30 is arranged at the desiccant dehumidifier 1 for detecting particles in the air that surrounds the desiccant dehumidifier 1. In the channels 4 there are provided sensors (not visible in FIG. 1). The sensors are sensors for sensing any of humidity, temperature, pressure or $CO_2$-content, or VOC-content (Volatile Organic Compounds), such as NMP (N-Methyl-2-pyrrolidone). The dehumidifier 1 further comprises control unit 31 and a rotor drive device 32. A transmitter (not shown) is connected to the sensors and provided for sending the output of the sensors as input to the control unit 31. The control unit 31 is configured to control the output of the heater 24, the reactivation air fan 26, the process air fan 20 and the rotor drive device 32 on basis of input from the sensors.

In other words, the dehumidifier 1 comprises a desiccant rotor 2 a fan 26 for forcing regeneration air through a first sector of the rotor 2, a heater 24 for heating the regeneration air before the regeneration air passes through the rotor 2, a fan 20 for forcing process air through a second sector of the rotor 2, and a rotor drive device 32 for rotating the rotor 2, and wherein the control unit 31 is configured to control the output of each of the fan 26 for forcing regeneration air through the first sector of the rotor 2, the heater 24 for heating the regeneration air before the regeneration air passes through the rotor 2, the fan 20 for forcing process air through the second sector of the rotor 2, and the rotor drive device 32 for rotating the rotor on basis of the input from the transmitter.

During production of the rotor, a quadratic or rectangular cubic body is built, and the rotor 2 is cut out of that body, such that channels 4 of the rotor extend through the rotor in an axial direction of the latter. In the exemplifying embodiment, the rotor 2 has a diameter of 150 cm and a thickness in its axial direction of 40 cm.

FIG. 2 shows a layered structure from which the desiccant rotor 2 is formed. According to one embodiment, the method of producing the desiccant rotor 2 comprises the steps of building the rotor 2 layer by layer, wherein a first layer 3 is formed by a flat sheet 3 and a second layer 5 is formed by a corrugated sheet 5 such that the channels 4 are defined between each first layer 3 and a neighbouring second layer 5. A suitable adhesive may be used for the attachment of first and second layers 3, 5 to each other. The first and second layers 3, 5 may be comprised by a fibre glass material embedded in a polymer. Other materials are also conceivable.

Clusters 7 of sensors are formed, each cluster 7 comprising a humidity sensor 9, a temperature sensor 11, a pressure 13 and a CO2-content sensor 15 onto a surface of the second layer 5, which surface will define said channel 4 upon attachment of a first layer 3 to a second layer 5. A suitable adhesive may be used for attaching the sensors to the layers of the rotor. Preferably, the same adhesive is used as the one used for adhering the first layers 3 to the second layers 5.

Each sensor of a cluster is arranged in a dedicated channel 4, and the distance between the sensors of one cluster is at most 2 channels. In the embodiment shown, the sensors of one cluster are located in four neighbouring channels.

Clusters 7 are also arranged at different levels in the axial direction of the rotor 2. Clusters 7 arranged at a common level are preferably distanced 100 mm to 200 mm from each other. In the embodiment shown, they are distanced 150 mm from each other. Clusters 7 at each level are populated over the whole cross-section of the rotor 2. In the disclosed embodiment, the distance between neighbouring levels in the axial direction of the rotor is 100 mm.

Neighbouring clusters of different levels (three levels are proposed in the disclosed embodiment) are arranged such that the sensors of those clusters do not share channels. Preferably, each channel 4 of the rotor 2 is provided with not more than one sensor.

The layers, preferably the first layers 3 formed by a flat sheet, are provided with a printed leads (not shown). The sensors are connected to the leads by leads or the like extending from the respective sensor through the second layer on which the sensor is adhered to the leads on the neighbouring first layer. On the perimeter of the rotor, an electrically conducting ring (not shown) may be arranged, which ring is connected to an electric power source and to the leads, thereby enabling the energizing of the sensors.

The sensors are IOT sensors, having their respective IP address. The data collected from the sensors may be used for controlling the operation of the desiccant dehumidifier 1, in particular control parameters such as temperature and flow rate of air flowing through the rotor 2 for the regeneration thereof, but also other parameters that may influence the operative conditions of the rotor.

The invention claimed is:

1. A method of producing a desiccant rotor of a desiccant dehumidifier, said desiccant rotor comprising a plurality of channels extending through the rotor, said method comprising the steps of:
   (a) building the rotor layer by layer, wherein at least every second layer is corrugated such that a channel is defined between at a first layer and a neighboring second layer; and
   (b) positioning a sensor onto a surface of the first layer or the second layer, which surface will define said channel upon said attachment of the first layer to the second layer.

2. A method according to claim 1, further comprising the step of:
   (c) applying an adhesive on and around the sensor after positioning of the sensor on said surface.

3. A method according to claim 2, wherein step (c) comprises applying said adhesive on all surfaces that define said channel or channels formed between the first and second layers.

4. A method according to claim 1, wherein a body comprising a stack of first and second layers is formed by repetition of step (a), and wherein the desiccant rotor is formed by the step of:
   (d) providing said body with a hub or a rotation center around which the body is configured to rotate during operation.

5. A method according to claim 4, further comprising the steps of:
   (e) providing an electric contact ring on an outer periphery of said body, and
   (f) providing an electric conductor extending from the contact ring to the sensor.

6. A method according to claim 1, wherein the sensor is a first sensor and the method further comprises the step of:
   g) attaching a second sensor onto a surface of a first layer or a second layer, which surface will define a channel upon said attachment of the first layer to the second layer, wherein the second sensor is arranged at a different depth of said channel as seen in an axial direction of the formed desiccant rotor than the depth at which the first sensor is provided or at a different distance from a rotational center axis of the rotor.

7. A method according to claim 6, wherein the first sensor and the second sensors are configured to sense the same observable.

8. A method according to claim 6, wherein the first and second sensors are provided in the same channel.

9. A method according to claim 6, wherein the first and second sensors are provided in different channels.

10. A method according to claim 9, wherein the first sensor and the second sensor are provided in different channels, and wherein said channels are provided at different distances from said rotational center.

11. A method according to claim 1, wherein the plurality of channels extend in an axial direction of the rotor.

12. A method according to claim 1, wherein said sensor or sensors is a sensor for sensing any of humidity, temperature, pressure or $CO_2$-content, or VOC-content, such as NMP.

13. A desiccant rotor comprising:
a plurality of channels extending through the rotor;
at least one sensor attached to a surface which defines one of said channels.

14. A desiccant rotor according to claim 13, wherein the plurality of channels extend in an axial direction of the rotor.

15. A desiccant rotor according to claim 13, wherein said sensor or sensors is a sensor for sensing any of humidity, temperature, pressure or $CO_2$-content, or VOC-content, such as NMP.

16. A desiccant rotor according to claim 13, further comprising:
a body including the plurality of channels;
an electric contact ring on an outer periphery of said body; and
an electric conductor extending from the contact ring to the sensor.

17. A desiccant rotor according to claim 13, wherein the sensor is a first sensor and the desiccant rotor further comprises a second sensor attached to a surface which defines one of said channels, wherein the second sensor is arranged at a different depth of said channel as seen in an axial direction of the formed desiccant rotor than the depth at which the first sensor is provided, and/or at a different distance from a rotational center axis of the rotor.

18. A desiccant rotor according to claim 17, wherein the first and second sensors are provided in different channels.

19. A desiccant rotor according to claim 13, comprising clusters of sensors, each cluster comprising at least two sensors, wherein a plurality of clusters is arranged at a first level in an axial direction of the rotor, and a corresponding plurality of clusters is arranged at second level in the axial direction of the desiccant rotor.

20. A desiccant rotor according to claim 13, produced by a method comprising the steps of:
(a) building the rotor layer by layer, wherein at least every second layer is corrugated such that a channel is defined between at a first layer and a neighboring second layer, and (b) positioning the at least one sensor onto a surface of the first layer or the second layer, which surface will define said channel upon said attachment of the first layer to the second layer.

21. A desiccant dehumidifier, comprising:
a desiccant rotor according to claim 13;
a control unit;
a transmitter for transmitting the output of the sensors as input to the control unit;
at least one of a fan for forcing regeneration air through a first sector of the rotor;
a heater for heating the regeneration air before the regeneration air passes through the rotor;
a fan for forcing process air through a second sector of the rotor; and
a rotor drive device for rotating the rotor,
wherein the control unit is configured to control the output of at least one the fan for forcing regeneration air through the first sector of the rotor, the heater for heating the regeneration air before the regeneration air passes through the rotor, the fan for forcing process air through the second sector of the rotor, and the rotor drive device for rotating the rotor on basis of the input from the transmitter.

22. The desiccant dehumidifier according to claim 21, comprising:
a fan for forcing regeneration air through a first sector of the rotor;
a heater for heating the regeneration air before the regeneration air passes through the rotor;
a fan for forcing process air through a second sector of the rotor; and
a rotor drive device for rotating the rotor,
wherein the control unit is configured to control the output of each of the fan for forcing regeneration air through the first sector of the rotor, the heater for heating the regeneration air before the regeneration air passes through the rotor, the fan for forcing process air through the second sector of the rotor, and the rotor drive device for rotating the rotor on basis of the input from the transmitter.

* * * * *